United States Patent [19]

Johns

[11] 4,398,893
[45] Aug. 16, 1983

[54] ERASABLE MAGNETIC DIAGRAMMING PANEL

[75] Inventor: Paul J. Johns, Juniata, Nebr.

[73] Assignee: Motion Marker Systems, Incorporated, Lincoln, Nebr.

[21] Appl. No.: 301,738

[22] Filed: Sep. 14, 1981

[51] Int. Cl.³ .............................................. G09B 19/14
[52] U.S. Cl. ..................................... 434/305; 273/239
[58] Field of Search .............. 40/426; 273/239, 1 GB; 434/73, 190, 251, 305, 409, 430

[56] References Cited

U.S. PATENT DOCUMENTS

| | | | |
|---|---|---|---|
| 2,668,370 | 2/1954 | Trimble | 434/305 |
| 2,708,580 | 5/1955 | Hamilton | 273/239 X |
| 3,106,042 | 10/1963 | Roethler | 434/305 X |
| 3,426,453 | 2/1969 | Dingwall | 434/409 |
| 3,659,353 | 5/1972 | D'Agrosa | 434/73 |
| 3,698,716 | 10/1972 | Rattey | 273/239 X |
| 4,043,558 | 8/1977 | Star | 273/1 GB X |
| 4,288,936 | 9/1981 | Okutsu | 434/409 X |

Primary Examiner—Harland S. Skogquist
Attorney, Agent, or Firm—Vincent L. Carney

[57] ABSTRACT

To permit easy changes in a diagram made over an overlay on a vertically-mountable panel, the panel includes a ferromagnetic backing material and a transparent nonmagnetic front panel spaced a predetermined distance from the back panel to receive movable magnetic symbol pieces with a fixed diagram between them. The size of the magnetic pieces and the spacing between the ferromagnetic back panel and the nonmagnetic front panel is such that the pieces may be lifted a slight distance from the back panel by moving a magnet that slides along the front panel and moved from place to place and yet, when the moving magnet is pulled free, the magnetic attraction to the ferromagnetic backing and the distances are such that the symbol is pulled back against the ferromagnetic back panel and is held in place against gravity. The transparent nonmagnetic front surface is flat, relatively firm and impermeable to moisture so that it may be marked upon and erased.

55 Claims, 9 Drawing Figures

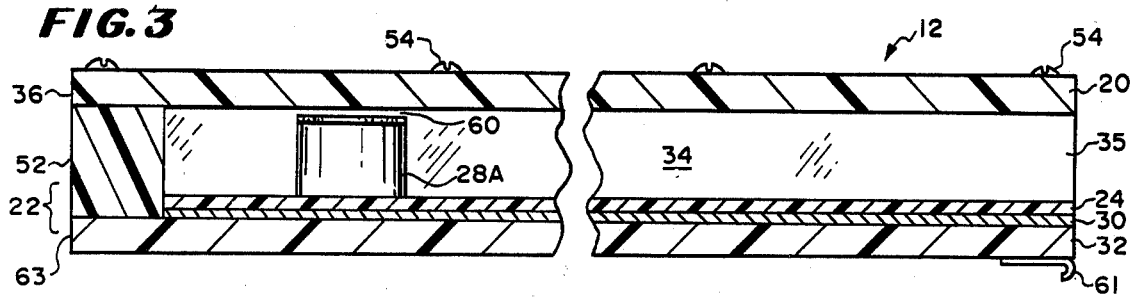
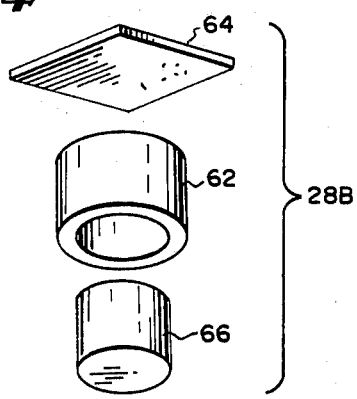
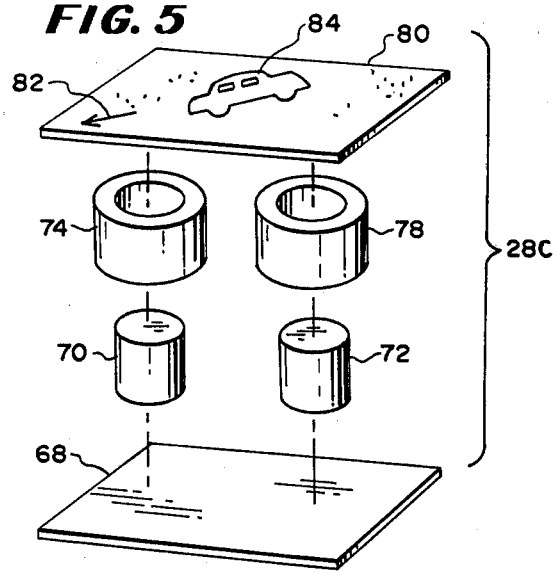
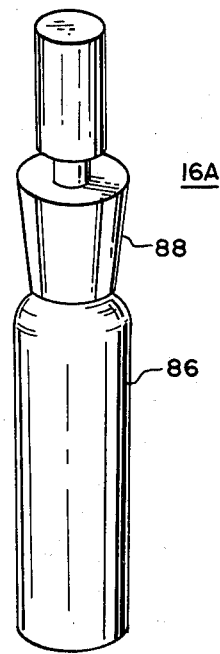
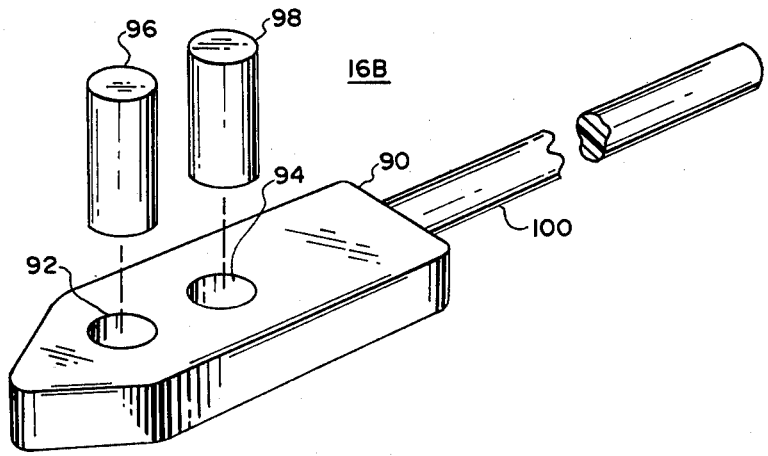

ERASABLE MAGNETIC DIAGRAMMING PANEL

BACKGROUND OF THE INVENTION

This invention relates to magnetic diagramming displays with movable-symbol pieces and more particularly to such displays which are capable of being supported in either a vertical or a horizontal position.

In one class of diagramming panel, there is a background design such as a football field or the like mounted to a ferromagnetic support. Movable-symbol pieces which may represent players on a football field or in the case of other background designs the appropriate movable pieces for the background are held magnetically in place.

In one type of prior art diagramming panel of this class, a ferromagnetic backboard has a diagram mounted to it, which for example, may be of a football field. The movable-symbol pieces include magnetic material and may, for example, represent football players which are held to the background. The players are moved by hand and it is possible to make other marks on the diagram. This type of panel is disclosed in U.S. Pat. No. 2,579,105.

Certain of the prior art panels of the above type have a disadvantage in that it is cumbersome to mark on the background panel. It is cumbersome because symbol pieces must first be moved and then the course across which they move traced. Erasure is difficult because the movable-symbol pieces are in the way and the entire operation is slow for illustrating purposes.

In one prior art type of diagramming panel of the above class, the magnetic symbol pieces also have mounted to them a marker so that, as the symbol pieces are moved, the path of their movement is marked on the overlying diagram. Such a prior art apparatus is disclosed in U.S. Pat. No. 1,927,695. While this type of diagramming panel has the advantage of being able to mark the path of the symbol pieces as they are moved, it has other disadvantages. One such disadvantage is that there must be a separate marker for every symbol piece and, whenever the symbol piece is moved, the mark is made.

One type of nonanalogous prior art is magnetic games which are generally played in a horizontal position and in which a magnet is used to move symbol pieces from place to place on a magnetic background with an overlying diagram. Generally, because these games cannot be mounted vertically and the paths of the symbol pieces are not traced, the games are not suitable for instructional or diagramming purposes.

SUMMARY OF THE INVENTION

Accordingly, it is an object of this invention to provide a novel diagramming panel.

It is a further object of the invention to provide a magnetic diagramming panel which may be used vertically or horizontally.

It is a still further object of the invention to provide a magnetic diagramming panel in which it is possible to move magnetic symbol pieces over a design which is fixed in place and, during movement, record the line of movement on an easily erasable writing surface which is not the surface against which the symbol pieces are held.

It is a still further object of the invention to provide a diagramming panel which permits rapid and fast diagramming.

In accordance with the above and further objects of the invention, a diagramming panel has a relatively flat bottom to permit it to lie horizontally and a supporting bottom or other means by which the panel can be supported or hung substantially vertically or at an angle to the horizontal. The diagramming area is flat and has a front smooth writing surface which is transparent, at least one central surface which is ferromagnetic and a bottom support surface. A spacer separates the front and central surfaces to form a compartment into which movable-symbol pieces and a fixed background diagram fit where they can be seen through the front transparent writing surface.

A moving or positioning magnet referred to as a magnetic mover is moved across the front writing surface above a symbol piece to move the symbol piece from place to place. The symbol pieces are released by pulling the magnet away. The movable-symbol pieces have sufficient magnetic strength and height with respect to the front panel having the writing surface so that they are drawn away from the ferromagnetic central surface and against the front transparent panel by the moving magnet when it is pressed against the writing surface, and moved with respect to the central ferromagnetic surface by the moving magnet and yet fall back against the center ferromagnetic surface when the moving magnet is pulled away even though the panel is vertical.

To provide diagrams indicating motion and direction of motion, a marker is mounted to the magnet. The magnet and marker may also be inserted at the end of a pointer so that a user may point at background locations on a vertically positioned diagramming panel, moving the symbol pieces from place to place and at the same time indicating the line of motion on the front surface. The lines may be quickly erased since the symbol pieces do not interfere with them.

For symbol pieces in which a special orientation or alignment of the symbol piece is desirable such as symbol pieces representing automobiles or other vehicles, under circumstances in which direction of rear to front of the vehicle is desirable, each movable-symbol piece has two magnets in it and the moving magnet has two poles with opposite polarity and spaced apart so that the alignment of the symbol piece may be controlled by the two poles of the moving magnet aligning the two poles of the symbol piece.

In use, the panel is mounted either vertically or horizontally and the symbol pieces are inserted within it where they may be seen in position with the diagramming background. The diagrammer then uses the magnetic mover, preferably with the marker attached, to move the movable-symbol pieces from location to location showing their line of motion as they move.

To move the symbol pieces, the moving magnet is positioned just above the symbol piece so that the symbol piece is lifted a short distance such as a sixteenth of an inch towards the front writing panel. The moving magnet is then moved with the marker pressed against the writing surface so a mark is made as it moves. The symbol piece follows the moving magnet and, when the moving magnet is pulled away from the top writing surface, the symbol piece falls back against the ferromagnetic center surface where it is held in place with respect to the existing diagram.

The operator may erase any of the lines indicating motion of the symbol piece in the top writing surface without disturbing the movable-symbol pieces since they are on a separate surface. New lines may also be made quickly, thus facilitating explanations.

From the above description it can be understood that this diagramming panel has the advantages of: (1) being mountable either vertically or horizontally; (2) being relatively simple in construction and economical; (3) being relatively easy to use; (4) permitting lines to be quickly made indicating the direction of movement of movable-symbol pieces held to the panel magnetically in one operation which both moves the symbol piece and indicates the direction and path of movement by a line; and (5) permitting lines which indicate the path of movement to be erased without disturbing the symbols.

SUMMARY OF THE DRAWINGS

The above noted and other features of the invention will be better understood from the following detailed description when considered in connection with the accompanying drawings in which:

FIG. 3 is a fragmentary, enlarged sectional view of a portion of the embodiment of FIG. 2;

FIG. 4 is an exploded perspective view of one embodiment of a portion of the embodiment of FIG. 1;

FIG. 5 is an exploded perspective view of another embodiment of the portion of the embodiment of FIG. 1;

FIG. 6 is a perspective view of one embodiment of another portion of the embodiment of FIG. 1;

FIG. 7 is a fragmentary exploded perspective view of another embodiment of a portion of the embodiment of FIG. 1;

DETAILED DESCRIPTION

Figure 1:
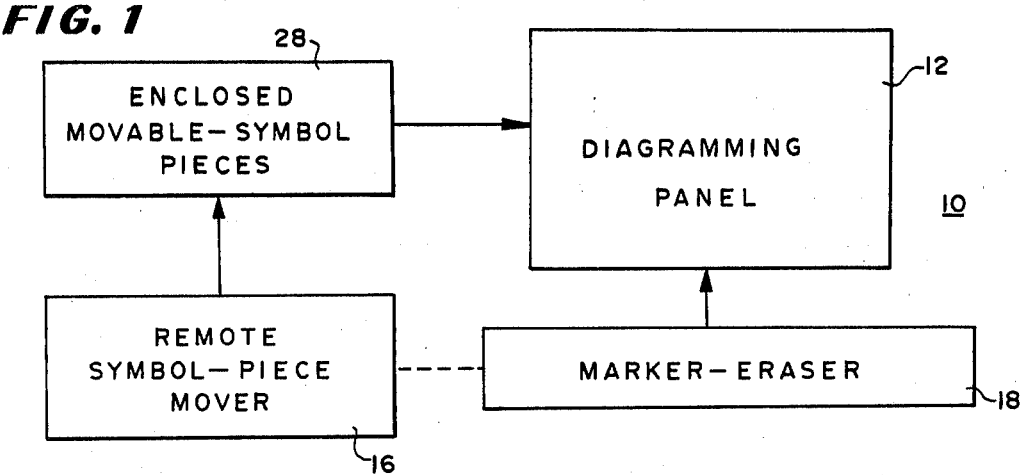
FIG. 1 is a block diagram illustrating an embodiment of the invention.

In FIG. 1, there is shown a block diagram of a diagramming system 10 having a diagramming panel 12, certain enclosed movable-symbol pieces or magnetic members 28, a remote symbol-piece mover or moving magnet or positioning magnet 16 and a marker-eraser 18.

The diagramming panel 12 is designed to be placed vertically on a stand in its normal use or alternatively to lie horizontally on a table while the user makes changeable diagrams on it over a fixed diagram. Within the diagramming panel 12 are certain enclosed movable-symbol pieces 28 held in place magnetically and moved during diagramming from place to place by the remote symbol-piece mover 16, which has attached to it a marker-eraser 18. The marker-eraser 18 may be used to make erasable marks as the symbol pieces are moved from place to place or to erase the marks without disturbing the movable-symbol pieces 28.

The diagramming panel 12 comprises an enclosure having a ferromagnetic back and a transparent front, with the enclosure being adapted to hold a background diagram which may be a diagram of a roadway or of a football field or the like. There is room within the enclosure to receive the movable-symbol pieces 14 which are magnetically held to the back of the diagramming panel 12 and can be moved by the remote symbol-piece mover 16 from the front of the panel outside of the transparent plate so that they may be shown at different locations on the background diagram. As they are moved, the marker-eraser 18 may make marks on the front transparent plate to show the course of movement such as the movement of players over a football field or of cars on a roadway.

The enclosed movable-symbol pieces 28 include a visible diagram of a distinct color or appearance and have mounted within them a magnet which is attracted to the ferromagnetic backplate of the diagramming panel 12 and to a magnet on the remote symbol-piece mover 16. They may be inserted into the diagramming panel 12 and moved from place to place to illustrate the position of football players or automobiles or the like.

The remote symbol-piece mover 16 is a pencil-shaped elongated member having embedded within it a magnet, electromagnet or ferromagnetic material which may be positioned against the transparent front plate of the diagramming panel 12 over one of the movable-symbol pieces 28 and then moved along the front plate to move the member, thus serving as a positioning magnet for the movable-symbol pieces 28. When pulled away from the plate, the piece is drawn back to the backplate of the diagramming panel 12 by magnetic attraction and held in position.

The marker-eraser 18 is normally a part of the remote symbol-piece mover 16 so that a mark may be made as the pieces are moved from place to place. Conveniently the marker-eraser 18 includes a felt member which can be used to erase the transparent plate without having to reposition the symbol piece.

Figure 2:
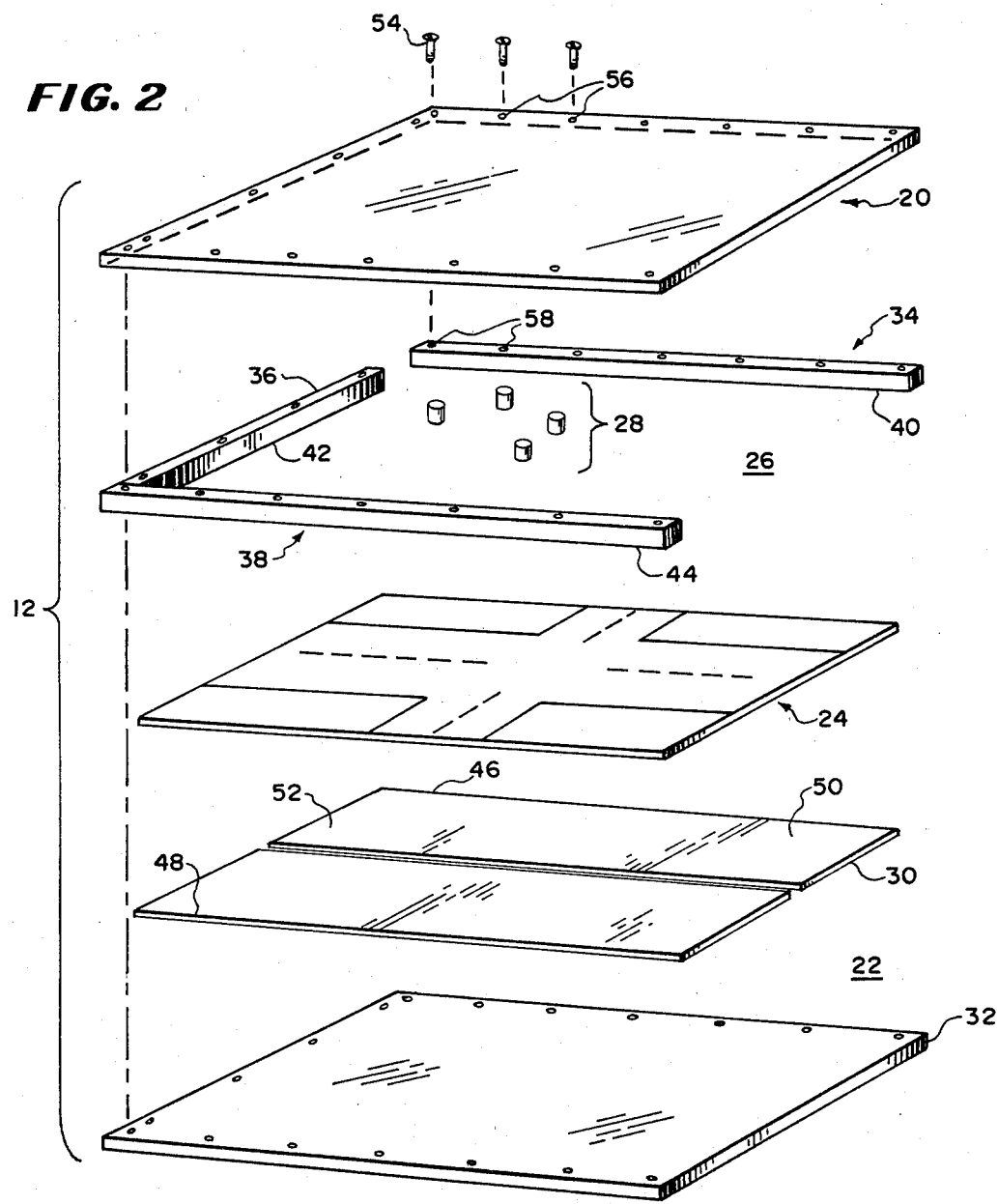
FIG. 2 is a simplified exploded perspective view of a panel which is used in an embodiment of the invention.

In FIG. 2, there is shown an exploded perspective view of the diagramming panel 12 having a transparent front diagram member 20, a rear symbol-piece holder 22, a fixed diagram member 24, and a spacer section 26 adapted to hold a plurality of movable-symbol pieces indicated generally at 28. The rear symbol-piece holder 22, the spacer section 26 and the transparent front diagram member 20 fit together to form an enclosure between them for receiving the fixed diagram member 24 and the movable-symbol pieces 28.

To form the rear symbol-piece holder 22, a thin foil or sheet 30 of ferromagnetic material, formed in two sections in the preferred embodiment, is fastened by adhesive or the like over the top surface of a flat plastic rectangular backplate 32. The plastic backplate 32 is sufficiently stiff to support the diagramming panel 12 and is formed of Plexiglas in the shape of a right regular parallelopiped having a top surface of approximately 12½ inches by 18 inches. The area of the top surface determines the diagramming area as will be described hereinafter.

The thickness of the backplate 32 is approximately an eighth of an inch but may be of any thickness to provide an adequate support without being excessively heavy. Moreover, the surface area may vary depending on the desired surface area for diagramming. Instead of a Plexiglas member, any other nonmagnetic, diamagnetic or paramagnetic material may be used to receive the ferromagnetic foil or in the alternative a single plate of ferromagnetic material may be used since the functions of the rear symbol-piece holder 22 are to: (1) provide magnetic attraction for the movable-symbol pieces 28 sufficient to support them on an inner or central surface;

and (2) to provide a rigid support for the diagramming 12 and symbol pieces.

To space the transparent front diagram member 20 from the rear symbol-piece holder 22, the spacer section 26 includes three elongated plastic wall members 34, 36 and 38, each shaped as right regular parallelopipeds with the elongated members 34 and 38 having lengths of 18 inches apiece in the preferred embodiment and the elongated member 36 having a length of 12 inches. The widths of the elongated members 34, 36 and 38 are each an eighth of an inch and their height is ½ inch. They are Plexiglas in the preferred embodiment.

To form a compartment, the elongated members 34 and 38 have their bottom surfaces 40 and 44 positioned against corresponding ones of the two parallel opposite edges 46 and 48 of the top surface 50 of the rear symbol-piece holder 22 to which they are fastened by any suitable means such as adhesive or heat sealing or the like. The elongated member 36 has its two side edges positioned against the end of the inner surfaces of the elongated members 34 and 38 and its bottom surface 42 resting along one of the edges 52 of the rear symbol-piece holder 22 to which it is fastened to form a U-shaped spacer wall having a height slightly larger than the height of the movable-symbol pieces shown at 28.

To provide a diagramming surface on the front of the diagramming panel 12, the transparent front diagram member 20 is a thin right regular parallelopiped that rests upon the top surfaces of the elongated spacer members 34, 36 and 38, being held along its edges by screws 54 or by adhesive or other device. It is transparent, has a smooth flat top surface which is non-absorbent and may be written upon, is electrically insulative and is formed of a nonmagnetic, paramagnetic or diamagnetic material. It has a top surface area of approximately 12½ inches by 18 inches and a thickness of ⅛ inch. In the preferred embodiment it is Plexiglas.

To provide fixed diagrams which cooperate with the movable-symbol pieces shown at 28 and with a temporary diagram drawn on the top surface of the transparent front diagram member 20, the fixed diagram member 24 is a thin plastic sheet having indicia printed or otherwise formed on it.

In one embodiment the fixed diagram member 24 lies on top of the top surface 50 within the elongated spacer members 34, 36 and 38, being of slightly smaller dimensions so that it is essentially 17⅞ inches long and 12 inches wide.

In another embodiment it fits along the edges of the top surfaces of the elongated spacer members 34, 36 and 38 just beneath the transparent front diagram member 20 and has substantially the same area as the transparent front diagram member 20 in that embodiment. In the preferred version of this embodiment it is 18 inches by 12½ inches. The fixed diagram member 24 has two holes along its edges in this embodiment which are aligned with corresponding screw holes in the transparent front diagram member 20 and in the spacer section shown at 56 and 58. All of the holes are alignable to receive threadably the screws 54 for holding the transparent front diagram member 20 in place and in one embodiment holding the fixed diagram holder in place.

The fixed diagram member 24 may have markers imitating roadways or a football field or the like in which the movable-symbol pieces 28 may be moved and the path of motion of the pieces shown by marks on the transparent front diagram member 20 as will be better described hereinafter.

The transparent front diagram member 20 may be made from materials other than clear Plexiglas. Indeed, for diagram panels, which may at times rest upon a table horizontally, it is desirable for the front diagram member 20 to be made of non-glare transparent material. In such an embodiment, the fixed diagram member 24: (1) is mounted just underneath the transparent front diagram member 20 where its edges are held between the top surfaces of the spacer members 34, 36 and 38 and the transparent front diagram member rather than against the rear symbol-piece holder 22; and (2) instead of being opaque as in embodiments that rest against the rear symbol-member holder 22, it is transparent so that the movable-symbol pieces 28 can be seen through it. This is because the diagram holder is difficult to see if spaced from a non-glare front plate.

The transparent front diagram member 20 need not be of any special material but should be: (1) capable of receiving the erasable marks on its outer surface and of transmitting magnetic flux through it; (2) nonconductive and either nonmagnetic, paramagnetic or diamagnetic; and (3) transparent or sufficiently translucent so that the fixed diagrams on the fixed diagram holder 24 and the movable-symbol pieces 28 can be seen through it.

In FIG. 3, there is shown in a sectional view the diagramming panel 12 illustrating the manner in which the transparent front diagram member 20 forming a second surface, the elongated spacer members 34, 36 and 38 and the rear symbol-piece holder 22 fit together to receive a movable-symbol piece 28A. In this embodiment, the fixed diagram member 24 is against the rear symbol-piece holder 22 forming the first surface instead of the rear symbol-piece holder and both it and several of the movable-symbol pieces 28A have been inserted through the open end 35 which provides the opening of the compartment formed by the elongated spacer members 34, 36 and 38, the rear symbol-piece holder 22 and the transparent front diagram member 20 to rest against the first surface.

To provide magnetic attraction, the ferromagnetic foil 30 is formed of two six-inch by eighteen-inch by five-mil pieces of shim stock sheet metal for convenience. It is bound to the backing member 32 by means of solvent glue in the preferred embodiment.

To provide a fixed diagram, the fixed diagram member 24 is formed as an inlay of fifteen-mil vinyl sheet stock. In the embodiment of FIG. 3, it is opaque white and a football field background is imprinted on its top surface. The markings may be placed on its top surface by a silk screening process or printed on it with acrylic ink or paint.

To permit a magnet to slightly lift the movable-symbol pieces 28 away from the ferromagnetic foil 30 and move it from place to place, the movable-symbol pieces 28A are slightly shorter than the inner dimension of the compartment formed by the elongated spacer members 34, 36 and 38 and leave a slight clearance of approximately 1/16 inch at 60. The movable-symbol pieces 28A include a ferromagnetic material which may be lifted by a magnet. The ferromagnetic material is magnetized and preferably a ceramic magnet commonly designated as Ceramic Magnet 1 sold by Indiana General.

The clearance 60 is related to the weight of the symbol piece and to the strength of the combined attraction between the moving magnet 16 which is lifting it and the magnetic strength of the movable-symbol piece 28A itself. The clearance 60 must be sufficient so that the attachment to the moving magnet 16 through the transparent front diagram member 20 is greater than the pull to the ferromagnetic foil 30 so that the movable-symbol piece 28A may be moved from place to place and then released by pulling the moving magnet 16 away from the transparent front diagram member 20, causing the symbol piece to be drawn and firmly held even when the foil 30 is vertical.

Thus, although different arrangements for magnetic force may be used, either ferromagnetic foil 30 or the movable-symbol piece 28A must be magnetized and the other member must be ferromagnetic. Similarly, if a handheld positioning magnet is used to move the movable-symbol piece 28A from place to place, it must have sufficient strength when related to the field strength of the movable-symbol piece 28A, the clearance 60, and the width of the front diagram member 20 to lift the movable symbol piece 28A away from the attracting rear symbol-marker holder 22. On the other hand, the magnetic attraction from the distance of the clearance 60 away from the rear symbol-marker holder 22 must be sufficiently great to permit the movable-symbol member 28A to be pulled back after being moved and released by the moving magnet.

To hold the magnetic symbol pieces to the panel when the panel is vertical, there should be certain relationships between the physical and magnetic characteristics of the panel and the magnetic symbol pieces. The static coefficient of friction between the contacting surfaces of each symbol piece and the symbol piece holder multiplied by the square of the flux density linking the symbol piece and the ferromagnetic backing multiplied by the area of the linkage by flux should be equal to or greater than the weight of the symbol piece.

To pull a symbol piece from the surface of the panel so it can be moved, there should be certain relationships between the physical and magnetic characteristics of the symbol piece, the positioning magnet and the panel. The square of the flux density linking the positioning magnet and the symbol piece multiplied by the area of the linking flux must be greater than the square of the flux density linking the symbol piece and the ferromagnetic backing. Of course, this requires proper selection of: (1) type of transparent member; (2) size of clearance 60; (3) thickness of transparent member; (4) magnetic material of positioning magnet; and (5) all other factors affecting the relative pull between positioning magnet and ferromagnetic backing.

In the preferred embodiment, the symbol piece is pulled through the clearance 60 against the inside surface of the transparent front diagram member 20 or the diagram panel where it is between the transparent plate and symbol piece.

To hold it in this position, there must be certain physical and magnetic relationships between the coefficient of static friction of the contacting surfaces of the symbol piece and plate and the linking flux density. The static coefficient of friction between the contacting surfaces of the symbol piece and the second surface multiplied by the square of the flux density linking the symbol piece and the positioning magnet multiplied by the area of the linking flux must be equal to or greater than the weight of the symbol piece added to the flux density linking the ferromagnetic backing and the symbol piece multiplied by the area of this linking flux.

This relationship also places restraints on: (1) the relative permeabilities of the plate and diagram panel; (2) their thickness; (3) the nature of their surfaces and that of the symbol pieces; (4) the field strengths and polarities of the positioning magnet and symbol pieces; and (5) the material and distances between the magnets and surfaces of the symbol pieces and positioning magnets.

To move the symbol pieces vertically, there must be certain relationships between the static and dynamic coefficient of friction of the contacting surfaces, the linking flux density, the weight of the symbol piece and the direction of movement.

To start moving the symbol piece upward against its weight, the square of the linking flux density multiplied by the area between the symbol piece and the positioning magnet must be sufficiently greater to compensate for inertia than the static coefficient of friction between the contacting surfaces of the symbol pieces and second surface multiplied by the force holding the symbol piece against the second surface plus the weight of the symbol piece. The force is equal to the square of the linking flux density multiplied by the area between the symbol piece and the positioning magnet minus the square of the flux density between the symbol piece and the ferromagnetic backing multiplied by the area of this flux.

To stop the symbol piece when moving it downwardly, the momentum should be kept reasonably small and the dynamic coefficient of friction between the contacting surfaces multiplied by the difference between two quantities, the first of which is the square of the flux density linking the symbol piece and the positioning magnet multiplied by the area of the linking flux and the second of which is the square of the flux density linking the symbol piece multiplied by its area must be sufficiently greater to compensate for momentum than the weight of the symbol marker.

To enable the symbol piece to fall into place when the positioning magnet is removed, the square of the flux density linking the ferromagnetic backing and the symbol piece when separated so that the symbol piece is against the second surface multiplied by the area of the flux multiplied by the desired accuracy for being drawn to the symbol holder from the point of release in inches should be equal to the separated distance multiplied by the weight of the symbol piece multiplied by 384.

Preferably, the square of the flux density linking the symbol piece when it is against the second surface multiplied by the area of the linking flux is less than 192 multiplied by the separation, multiplied by the weight of the symbol piece. Of course, the above calculations must be in a rational system of units with consistence between flux density, distance and weight in the same system. The required values for all of the above parameters can be determined by trial and error, changing the clearance 60 and the magnets with fixed plates and ferromagnetic backing until satisfactory results are obtained.

In one embodiment, a holder 61 is attached to one edge of the rear symbol-piece holder 22 to enable the vertical panel to be fastened to a nail or the like. In other embodiments it is absent and permits the bottom of the rear symbol-piece holder 22 to serve as a backing member and thus it is entirely flat for laying horizontally against a table. The bottom edge shown at 63 is adapted to rest against the ledge of an easel such as the type that are commonly used in courtrooms to support the vertical diagram panel 12 in a substantially vertical position at an angle to the horizontal for easy viewing.

In FIG. 4, one embodiment of movable-symbol piece 28B is shown having an outer Plexiglas cylindrical shell 62, a colored felt marking top 64 and a ceramic plug 66 magnetized to hold the entire assembly downwardly against the ferromagnetic cover rear symbol-piece holder 22. The ceramic plug 66 is held firmly within the cylindrical inner opening of the cylinder 62 and the felt marked top 64 is glued to the top so as to form the assembly shown at 28A.

In FIG. 5, another embodiment of movable-symbol piece 28C is shown having a nonconductive bottom, nonmagnetic, paramagnetic or diamagnetic plate 68, first and second cylindrical ceramic plugs 70 and 72, first and second Plexiglas cylinders 74 and 78 and marking felt 80, having upon it an arrow 82 indicating direction and a symbol such as that of an automobile 84.

In this embodiment, the magnetized ceramic cylindrical plugs 70 and 72 are received within the central openings of the Plexiglas cylinders 74 and 78 and are oriented oppositely so one has its north pole and the other has its south pole fastened to the nonmagnetic, paramagnetic or diamagnetic plate 68 to form a U-shaped, horseshoe type magnet with the ferromagnetic member 30 with the flux passing between the plugs 70 and 72 and through the member 30 and an open flux path at their upper ends through the felt marker 80.

The purpose of this magnetic piece, when fastened in place with the felt marker 80 and having the arrow 82 aligned between the two magnets 70 and 72 in the direction of the flux therebetween, is to permit alignment of the movable-symbol piece 28C with another horseshoe magnet. This alignment is accomplished by completing the flux path through the other magnets between the opposite poles of the ceramic magnets 70 and 72 and thus orienting it. It may be used to provide an added indication of direction.

In FIG. 6, there is shown one embodiment of remote symbol-piece mover 16A having a cylindrical magnetic portion 86 and a holder portion 88. The cylindrical magnetic portion is a bar of Permalloy or similar magnetic material having a diameter of approximately ½ inch and a length of 1¼ inches. It may have a felt bottom for convenience in moving along the top plate 20 to move symbol pieces and the holder portion 88 is shaped as a gently sloping conical frustrum for easy gripping. The two are fastened together for convenience in use.

In FIG. 7, there is shown another remote symbol-piece mover 16B suitable for use with the embodiment of symbol piece shown in FIG. 5. In the remote symbol-piece mover 16B, a Plexiglas base 90 contains two cylindrical parallel holes 92 and 94 extending through it and adapted to receive two ceramic cylindrical magnets 96 and 98. The base 90 is connected to an elongated cylindrical handle 100.

The ceramic magnetic plugs 96 and 98 are oriented with different polarities so that the positive pole of 96 and the negative pole of 98 are on the same side of the base and may be used to orient the symbol piece 28C shown in FIG. 5 with the arrow 82 pointing in a predetermined direction. This is accomplished by matching poles of the magnet 96 and 98 with the poles of the magnets 70 and 72 as described above while holding the handle 100. The handle 100, of course, may be of any length but in the preferred embodiment it is approximately 18 inches long and has a diameter of ⅜ inch. The cylindrical magnet 96 and 98 are of Permalloy and are approximately ½ inch in diameter each and approximately 1 inch long.

Figure 8:
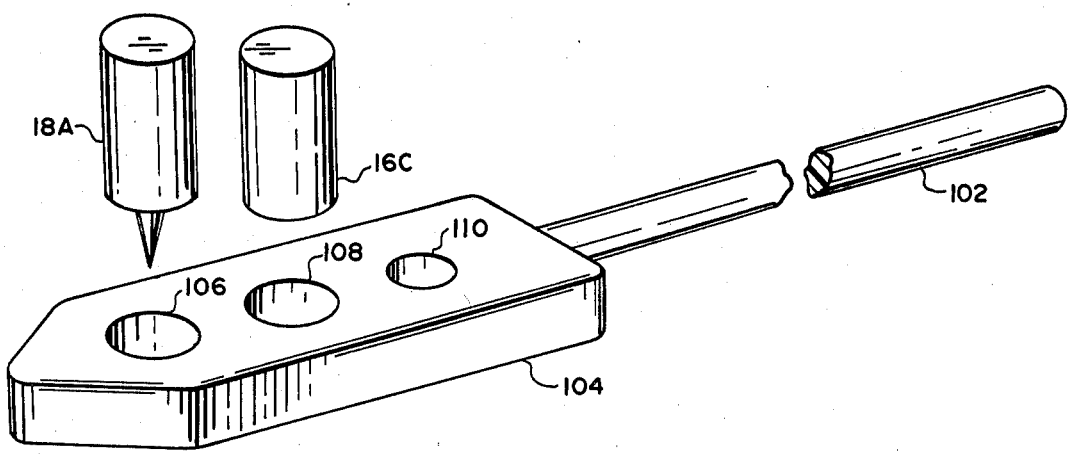
FIG. 8 is a fragmentary exploded perspective view of still another embodiment of a portion of the embodiment of FIG. 1.

In FIG. 8, there is shown a marker 18A attached to still another embodiment of remote symbol-piece mover 16C. In this embodiment a handle 102 similar to 100 in the embodiment of FIG. 7 is attached to a base 104 in a manner similar to the attachment of the handle 100 to the base 90 in FIG. 7. However, one of the openings 106 is adapted to receive a marker 18A suitable for marking on the front surface of the panel 20 and the other is adapted to receive a Permalloy magnet 16C for moving the movable-symbol pieces such as those shown at 28 (FIG. 2). Two magnets may be mounted to provide orientation as well. The purpose of this arrangement is to permit the members to be moved while at the same time indicating the path of motion by means of the marker 18A.

Of course a separate marker may be used instead of the combined marker and magnet in the embodiment of FIG. 8 or the markers may be mounted in different arrangements in the holes 106, 108 and 110. Any suitable kind of marker may be used but a dry erase marker of the type commonly sold is suitable. Any eraser may be used to wipe indications from the front transparent diagramming surface or a piece of cloth may be used, as desired.

Figure 9:
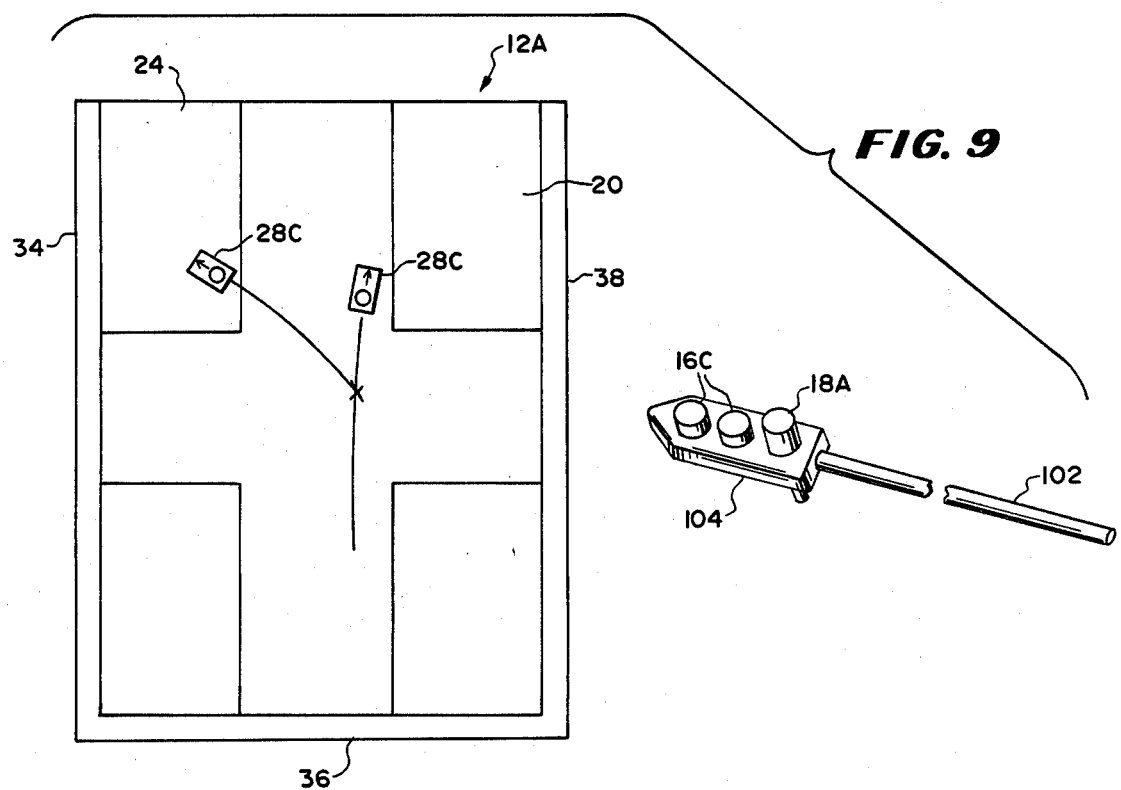
FIG. 9 is an elevational view illustrating diagrammatically the use of the embodiment of FIG. 1.

In FIG. 9, there is shown an elevational view of a diagramming system 10 showing a vertically mounted diagramming panel 12 with a road intersection background diagram member 24 positioned within it for display. Two enclosed movable-symbol pieces 28C are enclosed within the compartment of the panel 12, both of which represent automobiles. A remote symbol-piece mover 16 and marker-eraser 18 are shown connected together on a pointer having a handle 102 and a base 104.

In operation, the diagramming panel 12A is mounted in a horizontal or vertical position, the diagram member 24 and the symbols 28C are inserted. Once the symbol pieces are in position, they may be moved by the diagrammer and a mark may be made on the transparent front surface 20 of the diagramming panel 12A to indicate the path of movement.

To mount the diagramming panel 12A in either a substantially horizontal or substantially vertical position, it has: (1) a flat back which permits it to rest horizontally on a table or the like and still be operative; and (2) an edge that permits it to rest substantially vertically upon an easel or a hook which permits it to hang from a wall or the like. In each of these positions, the operation is substantially the same.

The fixed diagram may have any configuration upon it such as a football field for diagramming football plays or an intersection of a roadway such as that shown in FIG. 9 to illustrate the course of an automobile accident. In one embodiment the diagram member rests flat against the back of the diagramming panel but in another embodiment the diagram is transparent with opaque lines on it and rests up against the front surface 20. In the latter embodiment the movable-symbol pieces are viewed as being on top of the fixed diagram member.

The movable-symbol members such as 28C are inserted through the top as shown in FIG. 9 and are held in place because of their magnetic attraction to the ferromagnetic backing of the panel.

To orient the cars 28C, the two magnets 16C are placed adjacent to the glass surface 20 on top. The car aligns itself with these two magnets so that the north pole magnet of the symbol piece is adjacent to the south pole of the magnet 16C and the south pole on the symbol piece is aligned with the north pole. Thus by positioning the pointer the car on the symbol piece is aligned as though it was proceeding toward the intersection or in any other desired orientation.

If the marker 18A is present the cars may be moved by putting the pointer adjacent to them and moving it along the glass on the roadway. The marker 18A then describes the path of the car. On the other hand, if it is not desirable to draw the path, the marker may be omitted or the path may be drawn by separate marker at a separate time in coordination with the diagrammer's thinking or his speech in the case of a demonstration. After one path is drawn if it appears that would obscure or interfere with another mark, it can be erased or a different color or marker may be inserted removably within the holder.

From the above description it can be seen that the diagramming panel of this invention has several advantages such as: (1) it may be used in either a horizontal or vertical position; (2) movable-symbol pieces may be moved on a background diagram with ease while their path is automatically drawn thus providing for a fast diagramming action; (3) marks may be quickly and easily erased without disturbing the symbol pieces; and (4) a wide variety of different symbols and different backgrounds may be used.

Although a preferred embodiment of the invention has been described with some particularity, many modifications and variations in the embodiment are possible without deviating from the invention. Therefore, it is to be understood that, within the scope of the appended claims, the invention may be practiced other than as specifically described.

What is claimed is:

1. A panel for diagramming adapted for selective positioning in one of a substantially vertical and horizontal position comprising:

a flat diagramming area adapted to serve as a symbol piece holding means for holding symbol piece means;

means for mounting said flat diagramming area in a substantially vertical position;

said flat diagramming area including first and second spaced-apart plates;

said first plate being a rear plate including a ferromagnetic backing having ferromagnetic characteristics across its area;

means for mounting a design sheet between said first and second plates;

said second plate being transparent, whereby the design on said design sheet may be viewed from the front of said diagramming panel;

spacer means for mounting said first and second plates at predetermined distance from each other;

magnetic symbol piece moving means for moving symbols within said first and second plates by moving said symbol means across the surface of said first plate;

said magnetic symbol piece moving means including a positioning magnet;

magnetic symbol piece means movable in response to said magnetic moving means;

said second plate being sufficiently smooth and flat to receive marks;

one of said first plate and design sheets having a first surface and one of said design sheets and second plate having a second surface;

said first and second surfaces facing each other and being spaced from each other; and the static coefficient of friction between the contacting surfaces of each symbol piece means and the symbol piece holder means multiplied by the square of the flux density linking the symbol piece means and the ferromagnetic backing multiplied by the area of the linkage by flux being at least equal to the weight of the symbol piece means.

2. A panel according to claim 1 in which the square of the flux density linking the positioning magnet and the symbol piece means multiplied by the area of the linking flux is greater than the square of the flux density linking the symbol piece means and the ferromagnetic backing.

3. A panel according to claim 2 in which the static coefficient of friction between the contacting surfaces of the symbol piece means and the second surface multiplied by the square of the flux density linking the symbol piece and the positioning magnet multiplied by the area of the linking flux is at least equal to the weight of the symbol piece means added to the flux density linking the ferromagnetic backing and the symbol piece means multiplied by the area of this linking flux.

4. A panel according to claim 3 in which the square of the linking flux density multiplied by the area between the symbol piece means and the positioning magnet is sufficiently great to compensate for the forces of inertia, the static coefficient of friction between the contacting surfaces of the symbol piece means and second surface multiplied by the square of the linking flux density multiplied by the area between the symbol piece means and the positioning magnet and the weight of the symbol piece means.

5. A panel according to claim 4 in which the dynamic coefficient of friction between the contacting surfaces multiplied by the difference between two quantities, the first of which is the square of the flux density linking the symbol piece and the positioning magnet multiplied by the area of the linking flux and the second of which is the square of the flux density linking the symbol piece multiplied by its area is at least sufficiently large to compensate for momentum, and the weight of the symbol marker to enable the symbol piece means to fall into place when the positioning magnet is removed.

6. A panel according to claim 5 in which the square of the flux density linking the symbol piece means when it is against the second surface multiplied by the area of the linking flux is less than 192 multiplied by the separation, multiplied by the weight of the symbol piece.

7. Apparatus for diagramming adapted for selective positioning in one of a substantially vertical and horizontal position comprising:

a flat diagramming area;

means for mounting said flat diagramming area in a substantially vertical position;

said flat diagramming area including first and second spaced-apart plates;

said first plate being a rear plate having ferromagnetic characteristics across its area;

means for mounting a design sheet between said first and second plates;

said second plate being transparent, whereby the design on said design sheet may be viewed from the front of said diagramming panel;

spacer means for mounting said first and second plates at predetermined distance from each other;

magnetic symbol moving means for moving symbols within said first and second plates by moving said symbol means across the surface of said first plate;

magnetic symbol means movable in response to said magnetic moving means; and said second plate being sufficiently smooth and flat to receive marks.

8. Apparatus according to claim 7 in which:

the height of said magnetic symbol means is slightly less than the space between said first and second plates; and said magnetic members have sufficient magnetic strength so that they may be slightly lifted from said first plate by said magnetic symbol moving means and moved from said second plate back to said first plate to be held therein when said panel is in a vertical position.

9. Apparatus according to claim 8 in which said magnetic symbol moving means includes means for placing a visible mark on said second plate as said magnetic symbol moving means is moved across the outer surface of said second plate.

10. Apparatus according to claim 9 in which said magnetic symbol moving means includes first and second magnets.

11. Apparatus according to claim 10 further including an elongated handle fastened to said magnetic symbol moving means, whereby said magnetic symbol means may be moved from a distance.

12. Apparatus according to claim 11 in which said first plate includes a flat plastic plate with relatively thin ferromagnetic material across one surface.

13. Apparatus according to claim 12 in which said first and second plates are spaced from each other by plastic walls along three edges thereof, whereby an opening is left at one edge to receive said magnetic symbol means.

14. Apparatus according to claim 13 in which said magnetic symbol means include ceramic magnets.

15. Apparatus according to claim 14 in which said second plate is made of a nonconductive diamagnetic material.

16. Apparatus according to claim 13 in which said second plate is made of a nonconductive paramagnetic material.

17. Apparatus according to claim 7 in which said magnetic symbol moving means includes a means for placing a visible mark on said second plate as said magnetic symbol moving means is moved across the outer surface of said second plate.

18. Apparatus according to claim 17 in which said magnetic symbol moving means includes first and second magnets.

19. Apparatus according to claim 18 further including an elongated handle fastened to said magnetic symbol moving means, whereby said magnetic symbol means may be moved from a distance.

20. Apparatus according to claim 19 in which said first plate includes a flat plastic plate with relatively thin ferromagnetic material across one surface.

21. Apparatus according to claim 20 in which said first and second plates are spaced from each other by plastic walls along three edges thereof, whereby an opening is left at one edge to receive said magnetic symbol means.

22. Apparatus according to claim 21 in which said magnetic symbol means include ceramic magnets.

23. Apparatus according to claim 22 in which said second plate is made of a nonconductive diamagnetic material.

24. Apparatus according to claim 22 in which said second plate is made of a nonconductive paramagnetic material.

25. Apparatus according to claim 7 in which said magnetic mover includes first and second magnets.

26. Apparatus according to claim 25 further including an elongated handle fastened to said magnet symbol moving means, whereby said magnetic symbol means may be moved from a distance.

27. Apparatus according to claim 26 in which said first plate includes a flat plastic plate with relatively thin ferromagnetic material across one surface.

28. Apparatus according to claim 27 in which said first and second plates are spaced from each other by plastic walls along three edges thereof, whereby an opening is left at one edge to receive said magnetic symbol moving means.

29. Apparatus according to claim 28 in which said magnetic symbol moving means include ceramic magnets.

30. Apparatus according to claim 21 in which said second plate is made of a nonconductive diamagnetic material.

31. Apparatus according to claim 29 in which said second plate is made of a nonconductive paramagnetic material.

32. Apparatus according to claim 7 further including an elongated handle fastened to said magnetic symbol moving means, whereby said magnetic symbol means may be moved from a distance.

33. Apparatus according to claim 32 in which said first plate includes a flat plastic plate with relatively thin ferromagnetic material across one surface.

34. Apparatus according to claim 33 in which said first and second plates are spaced from each other by plastic walls along three edges thereof, whereby an opening is left at one edge to receive said magnetic symbol means.

35. Apparatus according to claim 34 in which said magnetic symbol means include ceramic magnets.

36. Apparatus according to claim 35 in which said second plate is made of a nonconductive diamagnetic material.

37. Apparatus according to claim 35 in which said second plate is made of a nonconductive paramagnetic material.

38. Apparatus according to claim 7 in which said first member includes a flat plastic plate with relatively thin ferromagnetic material across one surface.

39. Apparatus according to claim 38 in which said first and second plates are spaced from each other by plastic walls along three edges thereof, whereby an opening is left at one edge to receive said magnetic symbol means.

40. Apparatus according to claim 39 in which said magnetic symbol means include ceramic magnets.

41. Apparatus according to claim 40 in which said second plate is made of a nonconductive diamagnetic material.

42. Apparatus according to claim 40 in which said second plate is made of a nonconductive paramagnetic material.

43. Apparatus according to claim 7 in which said first and second plates are spaced from each other by plastic walls along three edges thereof, whereby an opening is left at one edge to receive said magnetic symbol means.

44. Apparatus according to claim 43 in which said magnetic symbol means include ceramic magnets.

45. Apparatus according to claim 44 in which said second plate is made of a nonconductive diamagnetic material.

46. Apparatus according to claim 45 in which said second plate is made of a nonconductive paramagnetic material.

47. Apparatus according to claim 7 in which said magnetic symbol means include ceramic magnets.

48. Apparatus according to claim 47 in which said second plate is made of a nonconductive diamagnetic material.

49. Apparatus according to claim 47 in which said second plate is made of a nonconductive paramagnetic material.

50. Apparatus according to claim 7 in which said second plate is made of a nonconductive diamagnetic material.

51. Apparatus according to claim 7 in which said second plate is made of a nonconductive paramagnetic material.

52. A magnetic mounting system comprising:
a compartment having first and second inner walls defining a predetermined width;
magnetic symbol means having a predetermined weight and height;
first magnetic means for holding said magnetic symbol means against said first inner wall when said wall is vertical;
second magnetic means for selectively pulling said magnetic symbol means against said second wall and moving it along said wall; and
said first magnetic means including means for pulling said magnetic symbol means back from said second wall against said first wall and holding it against said first wall when said second magnet means is released.

53. A magnetic mounting system according to claim 52 in which:
one side of said compartment is transparent;
said magnetic symbol means carries a symbol; and
said second magnet means includes a manual control, whereby said magnetic mounting system may be used by an operator to illustrate.

54. A magnetic mounting system according to claim 53 in which said first magnetic means comprises a magnet mounted to one of said magnetic symbol means and first vertical wall.

55. A magnetic mounting system according to claim 52 in which said first magnetic means comprises a magnet mounted to one of said magnetic symbol means and first vertical wall.

* * * * *